US008953478B2

United States Patent
Davydov et al.

(10) Patent No.: US 8,953,478 B2
(45) Date of Patent: Feb. 10, 2015

(54) EVOLVED NODE B AND METHOD FOR COHERENT COORDINATED MULTIPOINT TRANSMISSION WITH PER CSI-RS FEEDBACK

(75) Inventors: Alexei Davydov, Nizhny Novgorod (RU); Gregory Morozov, Nizhny Novgorod (RU); Alexander Maltsev, Nizhny Novgorod (RU); Ilya Bolotin, Nihzny-Novgorod (RU); Vadim Sergeyev, Nizhny (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/525,509

(22) Filed: Jun. 18, 2012

(65) Prior Publication Data
US 2013/0194943 A1 Aug. 1, 2013

Related U.S. Application Data

(60) Provisional application No. 61/591,641, filed on Jan. 27, 2012.

(51) Int. Cl.
H04W 24/10 (2009.01)
(52) U.S. Cl.
USPC ........................................................ 370/252
(58) Field of Classification Search
USPC ................ 370/252, 280, 311, 312, 329, 330;
455/436, 500, 518, 444
See application file for complete search history.

(56) References Cited

U.S. PATENT DOCUMENTS

2010/0220814 A1* 9/2010 Wu et al. ................... 375/308
2011/0110450 A1 5/2011 Gomadam et al.
(Continued)

FOREIGN PATENT DOCUMENTS

WO WO-2011085817 A1 7/2011
WO WO-2011088403 A1 7/2011
(Continued)

OTHER PUBLICATIONS

Chen, Hsiao-Hwa, Yeh, Jun-Feng, Suehiro, Naoki, A Multicarrier CDMA Architecture Based Orthogonal Complementary Codes for New Generations of Wideband Wireless Communications, IEEE Communications Magazine, Oct. 2001, pp. 126-135.*
(Continued)

Primary Examiner — Mark Rinehart
Assistant Examiner — Peter Solinsky
(74) Attorney, Agent, or Firm — Schwegman Lundberg & Woessner (57) ABSTRACT

An evolved Node B (eNB) and method for coherent coordinated multipoint transmission with per CSI-RS feedback are generally described herein. The eNB may configure a first cooperating point and a second cooperating point to jointly transmit a multi-node channel-state information (CSI) reference signal (RS) (CSI-RS) in predetermined resource elements of a resource block. The eNB may receive CSI reports as feedback from user equipment (UE). The CSI reports may include a precoding matrix indicator (PMI) indicating relative phase information between the cooperating points based on the multi-node CSI-RS. The CSI reports for the multi-node CSI-RS may be restricted to a PMI of rank-1. The eNB may configure the cooperating points for a coherent joint transmission to the UE based at least on the relative phase information. The coherent joint transmission may also be jointly beamformed based on single-node PMIs.

20 Claims, 3 Drawing Sheets

(56) References Cited

U.S. PATENT DOCUMENTS

| | | | |
|---|---|---|---|
| 2011/0170435 A1 | 7/2011 | Kim et al. | |
| 2011/0319065 A1* | 12/2011 | Dalsgaard et al. | 455/418 |
| 2012/0063431 A1* | 3/2012 | Darwood et al. | 370/338 |
| 2012/0189077 A1* | 7/2012 | Seo et al. | 375/267 |
| 2013/0003788 A1* | 1/2013 | Marinier et al. | 375/219 |
| 2013/0021925 A1* | 1/2013 | Yin et al. | 370/252 |
| 2013/0044685 A1* | 2/2013 | Fong et al. | 370/328 |
| 2013/0044707 A1* | 2/2013 | Chen | 370/329 |
| 2013/0083681 A1* | 4/2013 | Ebrahimi Tazeh Mahalleh et al. | 370/252 |
| 2013/0088978 A1* | 4/2013 | Mondal et al. | 370/252 |
| 2013/0121312 A1* | 5/2013 | Roman et al. | 370/335 |
| 2013/0201926 A1* | 8/2013 | Nam et al. | 370/329 |
| 2013/0215835 A1* | 8/2013 | Chen et al. | 370/329 |
| 2013/0258897 A1* | 10/2013 | Park et al. | 370/252 |
| 2013/0343220 A1* | 12/2013 | Chun et al. | 370/252 |
| 2014/0003349 A1* | 1/2014 | Kang et al. | 370/328 |
| 2014/0056279 A1* | 2/2014 | Chen et al. | 370/330 |

FOREIGN PATENT DOCUMENTS

| | | |
|---|---|---|
| WO | WO-2011115421 A2 | 9/2011 |
| WO | WO-2013112594 A1 | 8/2013 |

OTHER PUBLICATIONS

3GPP TS 35.211 version 10.4.0 Release 10, Jan. 2012.*

Taoka, Hidekazu, Nagata, Satoshi, Takeda, Kazuaki, Kakishima, Yuichi, She, Xiaoming, Kusume, Katsutoshi, MIMO and CoMP in LTE-Advanced.*

"International Application Serial No. PCT/US2013/022757, International Search Report mailed May 15, 2013", 3 pgs.

"International Application Serial No. PCT/US2013/022757, Written Opinion mailed May 15, 2013", 4 pgs.

* cited by examiner

Fig. 1

CSI-RS RESOURCE ASSIGNMENT

4TX CSI-RS TRANSMISSION

2TX CSI-RS TRANSMISSION

EVOLVED NODE B AND METHOD FOR COHERENT COORDINATED MULTIPOINT TRANSMISSION WITH PER CSI-RS FEEDBACK

PRIORITY CLAIM

This application claims priority under 35 U.S.C. 119(e) to U.S. Provisional Patent Application Ser. No. 61/591,641, filed on Jan. 27, 2012, which is incorporated herein by reference in its entirety.

TECHNICAL FIELD

Embodiments pertain to wireless communications. Some embodiments relate to coordinated multipoint (CoMP) operation in wireless networks. Some embodiments relate to coherent CoMP transmission. Some embodiments relate to multiple-input multiple-output (MIMO) communication techniques. Some embodiments relate to wireless networks operating in accordance with the 3GPP LTE-A standards.

BACKGROUND

CoMP operations include a wide range of techniques that enable dynamic coordination of transmission and/or reception with multiple geographically separated transmissions points (i.e., base stations, evolved node B's (eNBs) or remote radio heads (RRHs)). CoMP operation may help enhance overall system performance, utilize the resources more effectively and improve end user service quality. The use of several sites for each connection allows overall reception to be improved and the number of dropped calls to be reduced. Joint transmission (JT) by multiple transmission points enables the overall signal at the user equipment to be improved.

One issue with CoMP operation is providing the needed information for configuration of these joint transmissions. Another issue is the overhead on the uplink channels for reporting.

Thus there are general needs for improved CoMP techniques. There are also general needs for providing feedback in CoMP operations, including providing feedback with reduced overhead.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
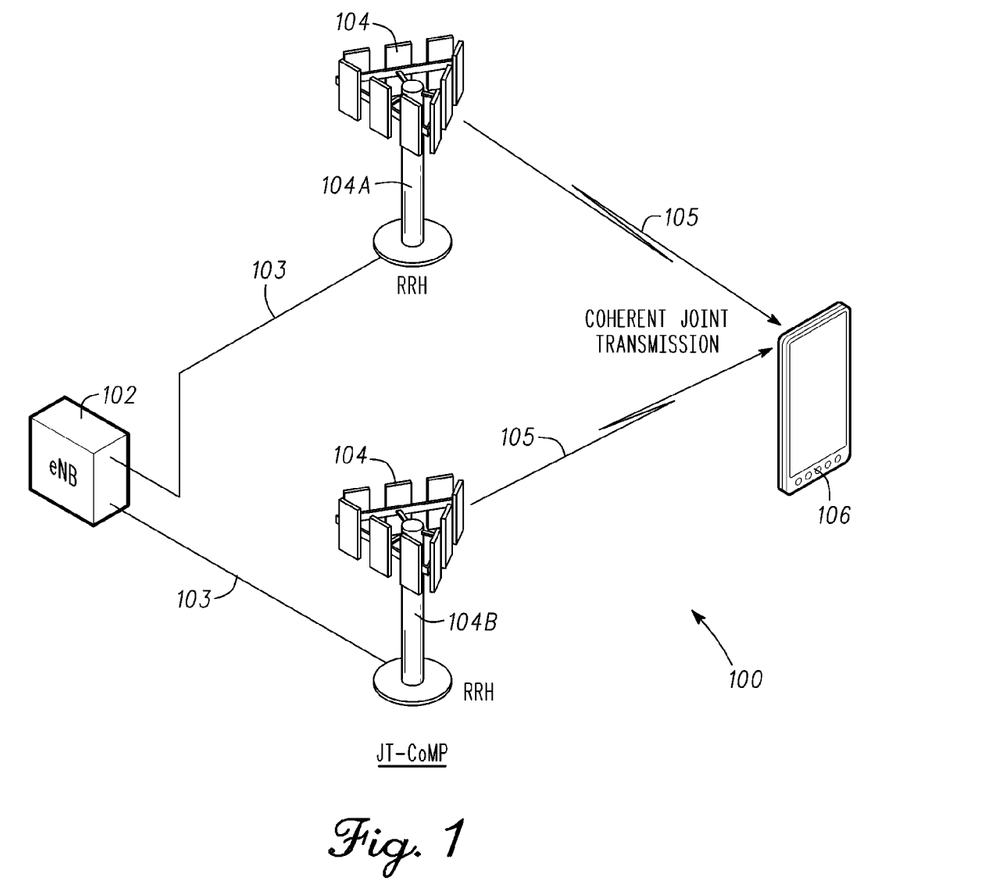
FIG. 1 illustrates a wireless network configured for JT CoMP operation in accordance with some embodiments.

FIG. 1 illustrates a wireless network configured for JT CoMP operation in accordance with some embodiments. Wireless network 100 includes an eNB 102 and a plurality of cooperating points 104, including a first cooperating point 104A and a second cooperating point 104B. The eNB 102, through the use of these cooperating points 104, may provide communication services to user devices, such as user equipment (UE) 106.

In some embodiments, the wireless network 100 may be a 3GPP LTE network and the eNB 102 may be configured for coherent joint transmissions. In these embodiments, the eNB 102 may configure the first cooperating point 104A and the second cooperating point 104B to jointly transmit a multi-node channel-state information (CSI) reference signal (RS) (CSI-RS) in predetermined resource elements of a resource block. Each cooperating point may transmit the multi-node CSI-RS using a single antenna or single antenna port. The eNB 102 may also be configured to receive CSI reports as feedback from the UE 106. The CSI reports may include a multi-node precoding matrix indicator (PMI) based on the multi-node CSI-RS. The multi-node PMI may indicate relative phase information between the first and second cooperating points 104A and 104B. The eNB 102 may configure the first and second cooperating points 104A and 104B for a coherent joint transmission 105 (i.e., a CoMP transmission) to the UE 106 based at least on the relative phase information.

In example embodiments, when two antenna ports are used to transmit the multi-node CSI-RS (i.e., one antenna port of each cooperating point), the multi-node CSI-RS may be a two-transmit antenna port (2TX) CSI-RS and the multi-node PMI may be a 2TX PMI. The scope of the embodiments is not limited in this respect.

In some embodiments, the eNB 102 may extract the relative phase information between the first and second cooperating points 104A and 104B from the reported multi-node PMI. The coherent joint transmission 105 may be a CoMP transmission in which the signals from the first and second cooperating points 104A and 104B are received substantially in-phase (coherently) by the UE 106. In some embodiments, the coherent joint transmission 105 comprises information transmitted on a downlink shared channel (such as the physical downlink shared channel (PDSCH) in some LTE embodiments). In some other embodiments, the coherent joint transmission 105 may comprise a downlink control channel (such as a physical downlink control channel (PDCCH) in some LTE embodiments) supporting coherent joint transmission.

In some embodiments, the reference signal (i.e., the multi-node CSI-RS) may be transmitted by both cooperating points 104A and 104B during the same time and frequency resource. The multi-node CSI-RS may be generated from the same bit sequence. These embodiments are described in more detail below.

In some embodiments, the first and second cooperating points 104A and 104B may comprise remote radio heads (RRHs) that communicate with the eNB 102 over links 103. The links 103 may be optical links, wired links or wireless links. In some embodiments, each RRH may be arranged to provide communications to UEs within a sector of a cell serviced by the eNB 102, although the scope of the embodiments is not limited in this respect. In some other embodiments, either or both cooperating points 104A and 104B may be an eNB. In some embodiments, each cooperating point 104A and 104B may provide communication services for a sector or a cell.

Figure 2:
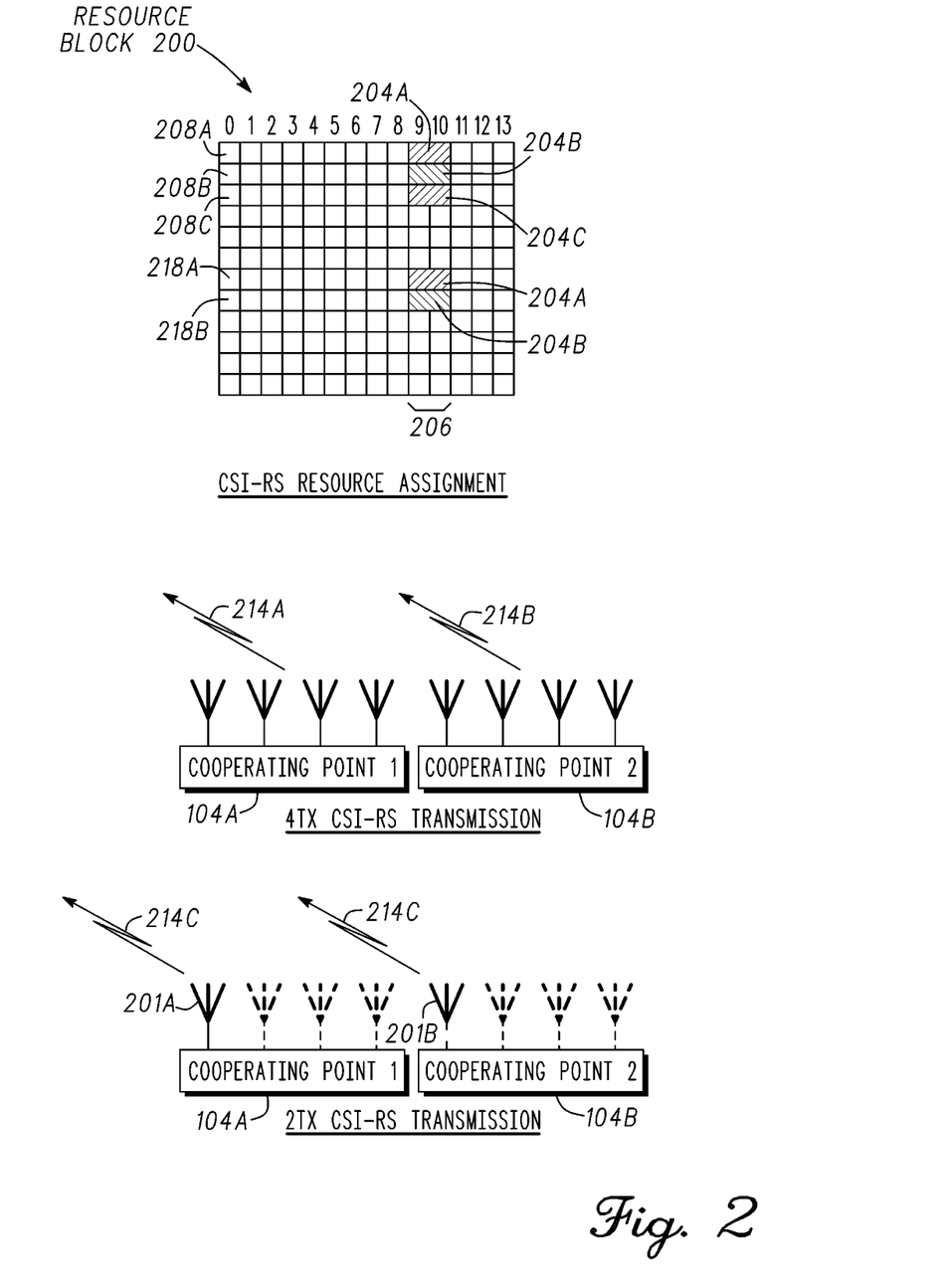
FIG. 2 illustrates CSI-RS resource assignment and transmission of reference signals in accordance with some embodiments.

FIG. 2 illustrates CSI-RS resource assignment and transmission of reference signals in accordance with some embodiments. Resource block (RB) 200 includes a plurality of time and frequency resources which may be referred to as resource elements (REs).

In accordance with embodiments, the eNB 102 (FIG. 1) may configure the first cooperating point 104A and the second cooperating point 104B to jointly transmit a multi-node CSI-RS 214C in predetermined resource elements 204C of the resource block 200. The multi-node CSI-RS 214C may be transmitted by both cooperating points 104A and 104B during the same time and frequency resource (i.e., resource elements 204C). As discussed above, the CSI reports received as feedback from the UE 106 (FIG. 1) that include the PMI may be used to configure the first and second cooperating points 104A and 104B for the coherent joint transmission 105 (FIG. 1).

In some embodiments, the multi-node CSI-RS 214C may be a 2TX CSI-RS when two antenna ports are used for transmission of the multi-node CSI-RS, although this is not a requirement. In these embodiments, the PMI may be a 2TX PMI.

The eNB 102 may also configure the first cooperating point 104A and the second cooperating point 104B to transmit a first single-node CSI-RS 214A in resource elements 204A of the resource block 200 and configure the second cooperating point 104B to transmit a second single-node CSI-RS 214B in resource elements 204B of the resource block 200. The eNB 102 may receive additional CSI reports as feedback from the UE 106 that include a PMI based on both the CSI-RSs (i.e., single-node CSI-RS 214A and single-node CSI-RS 214B) for use in joint beamforming of the coherent joint transmission 105. In these embodiments, the eNB 102 may configure the first and second cooperating points 104A and 104B to perform joint beamforming based on the PMI provided by the UE 106 for the joint transmission 105.

In some embodiments, joint beamforming may be performed by more than two cooperating points. In these embodiments, the eNB 102 may receive additional CSI reports as feedback from the UE 106 that include a PMI based on single-node CSI-RSs that were transmitted by more than two cooperating points for use in joint beamforming of the coherent joint transmission 105. In these embodiments, the eNB 102 may configure more than two cooperating points to perform joint beamforming based on the PMIs provided by the UE 106 for a coherent joint transmission 105. In these embodiments, the relative phase between pairs of cooperating points may also be provided for generating the coherent joint transmission 105.

In some embodiments, the first single-node CSI-RS 214A may be a four transmit antenna port (4TX) CSI-RS when the first cooperating point 104A uses four antenna ports to transmit the first single-node CSI-RS 214A. In some embodiments, the second single-node CSI-RS 214B may be a 4TX CSI-RS when the second cooperating point 104B uses four antenna ports to transmit the first single-node CSI-RS 214A. In these embodiments, the PMI based on these reference signals may be a 4TX PMI, although the scope of the embodiments is not limited in this respect.

In some example embodiments, the first cooperating point 104A may transmit the single-node CSI-RS 214A using four antennas or four antenna ports, and the second cooperating point 104B may transmit the single-node CSI-RS 214B using four antennas or four antenna ports. In these example embodiments, the multi-node CSI-RS 214C, on the other hand, may be transmitted by two antennas or antenna ports, one antenna port 201A associated with cooperating point 104A and one antenna port 201B associated with cooperating point 104B.

In accordance with some embodiments, a bit sequence used to generate the multi-node CSI-RS 214C may be generated from a configurable seed. The eNB 102 may be configured to inform the UE 106 of the configurable seed. In these embodiments, by informing the UE 106 of the configurable seed, the UE 106 may be able to generate the multi-node CSI-RS 214C and perform relative phase measurements.

In some embodiments, the cooperating points 104A and 104B may be associated with different cells having different cell IDs. The multi-node CSI-RS 214C, however, may be generated to be independent of either of these cell IDs to allow a CSI-RS generated from the same bit sequence to be transmitted in each cell.

In some embodiments, the multi-node CSI-RS 214C may be transmitted concurrently by antenna port 201A of the first cooperating point 104A and antenna port 201B of the second cooperating point 104B. The UE 106 may be configured to distinguish between transmissions of the multi-node CSI-RS 214C on different antenna ports based on an orthogonal complementary code (OCC) applied to the transmissions. In these embodiments, although the reference signal (i.e., the multi-node CSI-RS 214C) transmitted by both cooperating points (104A and 104B) may be based on the same bit sequence, the UE 106 may distinguish between the transmissions of the different antennas (i.e., between antenna port 201A and antenna port 201B) based on different orthogonal complementary codes applied to the transmissions, although the scope of the embodiments is not limited in this respect. These embodiments are discussed in more detail below.

In some embodiments, the eNB 102 may be configured to indicate to the UE 106 to restrict the CSI reports for the multi-node CSI-RS 214C to a PMI of rank-1. In these embodiments, the CSI reports for the multi-node CSI-RS 214C may be restricted to a PMI of rank-1 to allow the UE 106 to report an inter-point phase difference. In these embodiments, the rank restriction may be enabled by using a conventional codebook-subset-restriction parameter that may be signaled in higher layers. The codebook subset restriction may be a bitmap where each element corresponds to PMIs of different ranks. In these embodiments, higher rank feedback for the cooperating points 104A and 104B may be disabled for the multi-node CSI-RS 214C by setting to zero the bits for PMI vectors of higher ranks (i.e., ranks greater than 1). In these embodiments, restricting the rank of the PMI reports to rank-1 for the multi-node CSI-RS 214C allows the UE 106 to report the inter point phase difference. In the case of a 2TX CSI-RS, the CSI reports for the multi-node CSI-RS 214C may be restricted to a 2TX PMI of rank 1.

In some embodiments, the eNB 102 may further be configured to indicate to the UE 106 to disable channel-quality indicator (CQI) and rank indicator (RI) reporting for the multi-node CSI-RS 214C. In these embodiments, the CSI reports for the multi-node CSI-RS 214C may include only the PMI indicating relative phase information and would not include a CQI or a RI. In these embodiments, the multi-node CSI-RS 214C is primarily used for PMI feedback and the CQI and RI may not be needed. Accordingly, CQI and RI reporting may be disabled. In some embodiments, higher layer signaling (e.g., via radio-resource control (RRC) messages) may be used to indicate to the UE 106 to disable CQI and RI reporting for the multi-node CSI-RS 214C. In some embodiments, at least one of CQI reporting or RI reporting is disabled. In some embodiments, the UE 106 may be instructed to report only PMI vectors (e.g., the multi-node PMI) for the multi-node CSI-RS 214C to indicate the relative phase information. In some embodiments, restricting the rank of the PMI reports to rank-1 for the multi-node CSI-RS 214C and disabling CQI and RI reporting may be done during one configuration session, although this is not a requirement.

In some embodiments, a codebook entry with a different modulus of elements may be used to signal the inter-node phase difference. Although the scope of the embodiments is not limited in this respect, in some embodiments, the reported PMI of rank-1 may have a constant modulus property with a predetermined structure that includes a quantized phase value from a codebook to indicate the relative phase information. In these embodiments, the PMI of rank-1 may be a vector and the relative phase information may be reported on a second element of the vector. In these embodiments, the UE 106 may use a conventional PMI feedback framework to report the relative phase information.

In some of these embodiments, the predetermined structure of the PMI of rank-1 may be represented as $[1 \; exp(1i^*\phi)]^T$, wherein $\phi$ represents the relative phase information, 'i' is an imaginary number, and T is a matrix transpose. In embodiments that use the LTE 2TX codebook, $\phi$ may be a quantized phase value selected from a set such as the set $\{0, \pi/2, -\pi \text{ and } -\pi/2\}$. The UE 106 may quantize the relative phase with respect to the LTE 2TX codebook and select one of the quantized phase values of the set for indication in the 2TX PMI, although the scope of the embodiments is not limited in this respect.

In some alternate embodiments, a finer granularity of phase quantization may be provided. In these embodiments, extended codebooks of greater size may be used. For example, if a codebook with a finer granularity of phase quantization is used, the UE 106 may quantize the relative phase with respect to that codebook and select one of the quantized phase values of the set for indication in the CSI reports. For example, the quantized phase value selected from a set such as the set $\{0, \pi/4, \pi/2, 3\pi/4, \pi, -3\pi/4, -\pi/2, -\pi/4\}$, although the scope of the embodiments is not limited in this respect.

In some embodiments, a CSI report may be provided for each CSI-RS. In some embodiments, the CSI reports, including the multi-node PMI and single-node PMIs, may be transmitted by the UE 106 on an uplink control channel, such as the physical uplink control channel (PUCCH) or an uplink shared channel such as the physical uplink shared channel (PUSCH). In these embodiments, the CSI reports for the single-node CSI-RS 214A and the single-node CSI-RS 214B may include a CQI, a RI, and a PMI. Overhead and interference may be reduced on the uplink control channels by disabling CQI and RI reporting for the multi-node PMI as discussed above, although this is not a requirement.

In the example shown in FIG. 2, the single-node CSI-RS 214A, the single-node CSI-RS 214B and the multi-node CSI-RS 214C are transmitted concurrently (i.e., during the same symbol times 206) of the resource block 200, however this is not a requirement as these reference signals may also be transmitted in different symbol times.

In the example shown in FIG. 2, the first single-node CSI-RS 214A is transmitted concurrently on first and second subcarriers 208A and 218A, the second single-node CSI-RS 214B is transmitted concurrently on third and fourth subcarriers 208B and 218B, and the multi-node CSI-RS 214C is transmitted on fifth subcarriers 208C. The scope of the embodiments is not limited to the configuration illustrated in FIG. 2 as other configurations may also be used. In some embodiments, the CSI-RS for one antenna set (e.g., CSI-RS 214A) may be mapped to certain resource elements in accordance with the LTE standard. The CSI-RSs for different antenna sets, however, may be configured independently from each other.

In the example illustrated in FIG. 2, the first single-node CSI-RS 214A is transmitted in resource elements 204A, the second single-node CSI-RS 214B is transmitted in resource elements 204B, and the multi-node CSI-RS 214C is transmitted in resource elements 204C. In this example, resource elements 204A of subcarrier 208A, resource elements 204A of subcarrier 218A, resource elements 204B of subcarrier 208B, resource elements 204B of subcarrier 218B, and resource elements 204C of subcarrier 208C may each comprise two consecutive resource elements at symbol times nine and ten of the resource block 200, although this is not a requirement as other symbol times may be used. In these example embodiments, the first single-node CSI-RS 214A and the second single-node CSI-RS 214B are used for beamforming feedback, and the multi-node CSI-RS 214C is used for phase estimation feedback. In some of these embodiments, the coherent joint transmission 105 may be a MIMO transmission utilizing a plurality of spatial channels, and the cooperating points 104A and 104B may be configured to perform joint beamforming.

In accordance with embodiments, the first single-node CSI-RS 214A, the second single-node CSI-RS 214B, and the multi-node CSI-RS 214C may be uniquely coded for each antenna port to allow the UE 106 distinguish between transmissions of a reference signal from different antenna ports.

In the example embodiments illustrated in FIG. 2, each single-node CSI-RS may occupy twice as many resource elements as a multi-node CSI-RS in order to provide reference signals for twice as many antennas or antenna ports. Different reference signals may also occupy different resource elements of the frame. Because the UE 106 may know a-priori where to search for a particular signal, the DE 106 may be able to distinguish between them. Each different CSI-RS may be modulated with a different bit sequence, which may be generated from a seed as discussed above. The bit sequence may be a pseudo-random bit sequence. In some LTE embodiments, the particular bit sequence may be derived based on the cell ID parameter associated with the cooperating point 104 that is transmitting the reference signals. It should be noted that the first single-node CSI-RS 214A and the second single-node CSI-RS 214B may be associated with different cell IDs, while the multi-node CSI-RS 214C may be independent of the different cell IDs.

In accordance with embodiments, a multi-node CSI-RS (such as multi-node CSI-RS 214C) transmitted from different antenna ports of a pair of antenna ports may be distinguished by the application of two different Orthogonal Complimentary Codes (OCC) of length 2 (a=[1,1] and a=[1,−1]) which are mapped to two consecutive resource elements in the time domain. The scrambling sequence for the CSI-RS may be applied to each pair of CSI-RS resource elements (e.g., two consecutive resource elements) in different physical resource blocks (PRB) (in the frequency domain) for randomization. As discussed above, the multi-node CSI-RS 214C, on the other hand, may be generated based on a CSI-RS sequence scrambling seed that is configurable and not dependent on a cell identity or cell ID.

In some embodiments, the CSI reports for the multi-node CSI-RS 214C may be configured in accordance with an a-periodic CSI reporting mode and a periodic PUCCH 0-1 CSI reporting mode. The a-periodic CSI reporting modes may include an a-periodic PUSCH 0-1 CSI reporting mode, a PUSCH 0-2 CSI reporting mode, and a periodic PUCCH 0-1 CSI reporting mode, although the scope of the embodiments is not limited in this respect. In these embodiments, the first index of '0' indicates no CQI reporting (that the CSI reporting mode does not include a CQI) while the second index of '1' indicates that a PMI is included. In these embodiments, the CSI reports for the multi-node CSI-RS 214C do not need to include a CQI. In these embodiments, the eNB 102 may configure the UE 106 for CSI reporting in accordance with one of a-periodic PUSCH 0-1 CSI reporting mode, a PUSCH 0-2 CSI reporting mode, and a periodic PUCCH 0-1 CSI reporting mode.

In accordance with some LTE embodiments, the first index of "1" may indicate wideband CQI reporting, a first index of '2' may indicate subband CQI reporting, and a first index of '3' may indicate a higher layer configured subband CQI. In these embodiments, the second index of '1' may indicate a single PMI report and a second index of '2' may indicate multiple PMI reports, although the scope of the embodiments is not limited in this respect.

Figure 3:
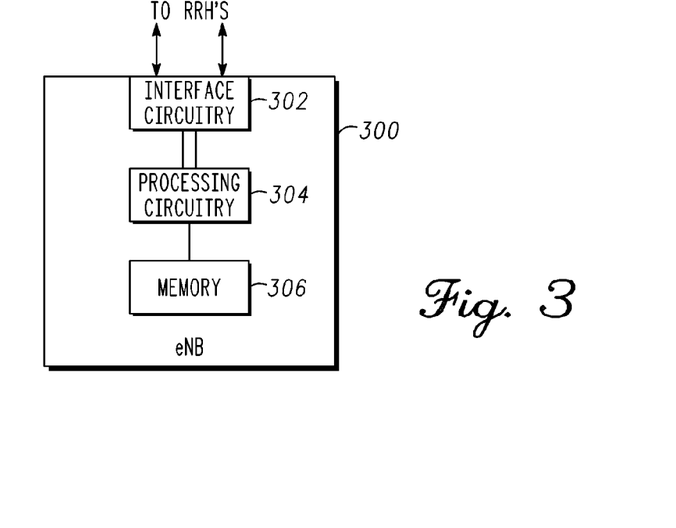
FIG. 3 is a functional diagram of an eNB in accordance with some embodiments.

FIG. 3 is a functional diagram of an eNB in accordance with some embodiments. The eNB 300 may be suitable for use as eNB 102 (FIG. 1). The eNB 300 may include interface circuitry 302 for transmitting and receiving signals to and from RRHs. The eNB 300 may also include processing circuitry 304 and memory 306 configured to perform the various operations described herein. The RRHs may include physical (PHY) layer circuitry, while the processing circuitry 304 may include a media access control (MAC) layer, although this is not a requirement. In some embodiments, baseband signals may be communicated over links 103.

In other embodiments the eNB 300 may include an antenna system to exchange signals with the UE 106 over a wireless channel. In some of these embodiments the eNB 300 may be one of the cooperating points 104A and 104B and the other cooperating points may be RRHs connected to the eNB 300 via links 103, other eNBs coordinating transmission with the eNB 300 via a backhaul network, or combination of both.

Although the eNB 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 106 may be configured with the instructions to perform the operations described herein.

Referring back to FIG. 1, in some embodiments, the UE 106 may include one or more of a keyboard, a display, a non-volatile memory port, multiple antennas, a graphics processor, an application processor, speakers, and other mobile device elements. The display may be an LCD screen including a touch screen. The one or more antennas utilized by the UE 106 as well as cooperating points 104 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In MIMO embodiments, the antennas may be effectively separated to take advantage of spatial diversity and the different channel characteristics that may result between the antennas of two communication stations. In some MIMO embodiments, the antennas may be separated by up to ¹/₁₀ of a wavelength or more. In LTE embodiments, an antenna may refer to an antenna port which may refer to one or more antennas operating together.

In some embodiments, the UE 106 may be configured to receive OFDM communication signals over a multicarrier communication channel. The OFDM signals may comprise a plurality of orthogonal subcarriers. In some broadband multicarrier embodiments, eNB 102 may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution Advanced (LTE-A) communication network, although the scope of the disclosure is not limited in this respect. In these broadband multicarrier embodiments, the UE 106 and the eNB 102 may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the PRB, such as resource block 200 (FIG. 2). The PRB may comprise 12 subcarriers in the frequency domain× 0.5 milliseconds (ms) in the time domain. The PRBs may be allocated in pairs (in the time domain). In these embodiments, the PRB may comprise a plurality of resource elements which may comprise one subcarrier per one symbol. In these LTE embodiments, the types of reference signals that may be transmitted by an eNB including demodulation reference signals (DM-RS), the CSI-RSs discussed above, and/or a common reference signal (CRS). The DM-RS may be used by the UE 106 for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some embodiments, the UE 106 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 106 may calculate several different feedback values which may be used to perform channel adaption for closed-loop spatial multiplexing transmission mode. These feedback values may include the CQI, the RI and the PMI discussed above. From the CQI, the transmitter selects one of several modulation alphabets and code-rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB 102 may be based on the CQI. The PMI may be a vector that is calculated by the UE 106 and reported to the eNB 102. In some embodiments, the UE 106 may transmit a PUCCH of format 2, 2a or 2b containing the CQI, PMI and/or RI.

In these embodiments, the CQI may be an indication of the downlink mobile radio channel quality as experienced by the UE 106. The CQI allows the UE 106 to propose to the eNB 102 an optimum modulation scheme and coding rate to use for a given radio link quality so that the resulting transport block error rate would not exceed a certain value, such as 10%. In some embodiments, the UE 106 may report a wideband CQI value which refers to the channel quality of the system bandwidth. The UE 106 may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB 102 for a given radio condition. The PMI value may refer to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding for MIMO modes.

Figure 4:
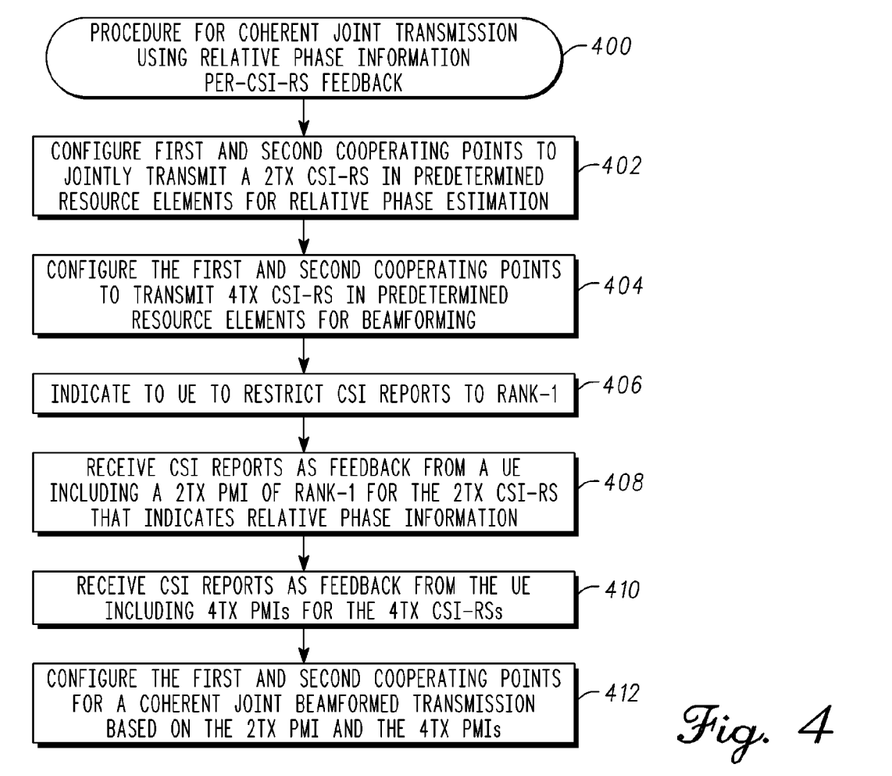
FIG. 4 is a procedure for coherent joint transmission in accordance with some embodiments.

FIG. 4 is a procedure for coherent joint transmission in accordance with some embodiments. Procedure 400 may be performed by an eNB, such as eNB 102 (FIG. 1).

In operation 402, the eNB 102 may configure a first cooperating point and the second cooperating point to jointly transmit a 2TX CSI-RS in predetermined resource elements for relative phase estimation. In some embodiments, a bit sequence used to generate the 2TX CSI-RS may be generated from a configurable seed, and the eNB 102 may inform the UE 106 of the configurable seed to allow the UE 106 to generate the 2TX CSI-RS.

In operation 404, the eNB 102 may configure the first and second cooperating points to each transmit a 4TX CSI-RS in predetermined resource elements at least for beamforming.

In operation 406, the eNB 102 may indicate to the UE 106 to restrict the CSI reports for the 2TX CSI-RS to a 2TX PMI of rank-1.

In operation 408, the eNB 102 may receive CSI reports as feedback from the UE 106. The CSI reports may include a 2TX PMI based on the multi-node CSI-RS 214C, and the 2TX PMI may indicate the relative phase information between the first and second cooperating points.

In operation 410, the eNB 102 may receive additional CSI reports as feedback from the UE 106. The additional CSI reports may include a 4TX PMI based on both the 4TX CSI-RSs.

In operation 412, the eNB 102 may configure the first and second cooperating points to generate signals for a coherent joint transmission 105 (FIG. 1) that is a beamformed transmission based on the 2TX PMI and the 4TX PMI provided by the UE 106.

Referring back to FIG. 1, in some embodiments, the eNB 102 may configure at least a first cooperating point 104A and a second cooperating point 104B to jointly transmit a multi-node CSI-RS in predetermined resource elements of a resource block, and receive CSI reports as feedback from the UE 106. The CSI reports may include a PMI indicating the relative phase information between the first and second cooperating points based on the multi-node CSI-RS. The eNB 102 may also configure at least the first and second cooperating points for a coherent joint transmission to the UE 106 based at least on the relative phase information. The multi-node CSI-RS transmitted by each of the cooperating points 104A and 104B may be distinguishable. The eNB 102 may be configured to indicate to the UE 106 to restrict the CSI reports for the multi-node CSI-RS to a PMI of rank-1. The first and second cooperating points 104A and 104B may be associated with different cells having different cell IDs, and the multi-node CSI-RS transmitted by each of the cooperating points 104A and 104B is independent of the cell IDs.

In some of these embodiments, the multi-node CSI-RS transmitted by each of the cooperating points 104A and 104B is a NTX CSI-RS wherein N corresponds to a number of antennas used by the cooperating points to concurrently transmit the multi-node CSI-RS. The PMI may be an NTX PMI. In these embodiments, N may range from two to eight or more depending on the number of cooperating points. In some embodiments, each cooperating point may be configured to transmit the multi-node CSI-RS with a single antenna.

In some of these embodiments, when two cooperating points are used, the two cooperating points may be configured to transmit a 2TX CSI-RS for phase measurement in which each cooperating point may transmit a CSI-RS with a single antenna. When four cooperating points are used, the four cooperating points may be configured to transmit a 4TX CSI-RS for phase measurement in which each cooperating point may transmit a CSI-RS with a single antenna. When eight cooperating points are used, the eight cooperating points may be configured to transmit an 8TX CSI-RS for phase measurement in which each cooperating point may transmit a CSI-RS with a single antenna. These embodiments allow a UE to measure phase information based on a single CSI-RS transmission. In these embodiments, the reference signals transmitted by each antenna may be distinguishable from each other and generated from the same bit sequence, even though each cooperating point may be associated with a different cell. This is unlike some conventional systems in which the bit sequence is associated with a cell ID.

In some other embodiments, a 2TX CSI-RS may be used for four cooperating points. In these embodiments, each pair of the four cooperating points may be configured to transmit the 2TX CSI-RS separately and the UE may perform phase measurements for each transmitting pair. In this example, three different pairs of cooperating points may be configured to separately transmit a 2TX CSI-RS. In these embodiments, the UE may report a 4TX PMI indicating relative phase information between the pairs of cooperating points.

Embodiments disclosed herein are applicable to configuring any number of nodes to transmit reference signals, configuring a UE to measure and report the relative phase information between the reference signals, and configuring a coherent joint transmission to the UE based on the relative phase information.

Although some embodiments are illustrated with the cooperating points 104 having four antennas, the scope of the embodiments is not limited in this respect. Furthermore, there is no requirement that each cooperating point have the same number of antennas. Accordingly, CSI-RS may be configured based on the number of antennas used and may include 1TX, 2TX, 4TX, 8TX as well as other CSI-RS. The term "antenna," as used herein, may refer to an antenna port rather than a physical antenna.

In some embodiments, the multi-node CSI-RS may be transmitted concurrently by a first antenna of the first cooperating point and a second antenna of the second cooperating point, and the UE may be configured to distinguish between transmissions of the multi-node CSI-RS on the first and second antennas based on an orthogonal complementary code applied to the sequence. In some of these embodiments, the PMI of rank-1 may have a constant modulus property with a predetermined structure that includes a quantized phase value from a NTX codebook to indicate the relative phase information.

In some embodiments, the eNB may also configure the first cooperating point to transmit a first single-node CSI-RS in first resource elements of the resource block, configure the second cooperating point to transmit a second single-node CSI-RS in second resource elements of the resource block, and receive additional CSI reports as feedback from the UE. The additional CSI reports may include a single-node PMI for each of the single-node CSI-RSs for use in joint beamforming of the coherent joint transmission.

In some embodiments, the first single-node CSI-RS, the second single-node CSI-RS, and the multi-node CSI-RS are uniquely coded for each antenna port to allow the UE to distinguish between transmissions from different antenna ports. The first single-node CSI-RS may be an NTX CSI-RS in which N corresponds to a number of antenna ports used by the first cooperating point to transmit the first single-node CSI-RS. The second single-node CSI-RS may be an NTX CSI-RS in which N corresponds to a number of antenna ports used by the second cooperating point to transmit the second single-node CSI-RS.

There is no requirement that the same number of antenna ports be used by each cooperating point to transmit a single-node CSI-RS. In some embodiments, the cooperating points, such as cooperating points 104A and 104B, may use a differing number of antennas to transmit a single-node CSI-RS, although the scope of the embodiments is not limited in this respect.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An evolved Node B (eNB) comprising interface circuitry, processing circuitry, and memory configured to:
   configure at least a first cooperating point and a second cooperating point to jointly transmit a multi-node channel-state information (CSI) reference signal (RS) (CSI-RS) in predetermined resource elements of a resource block;
   receive CSI reports as feedback from user equipment (UE), the CSI reports including a precoding matrix indicator (PMI) indicating relative phase information between the first and second cooperating points based on the multi-node CSI-RS;
   and configure at least the first and second cooperating points for a coherent joint transmission to the UE based at least on the relative phase information.

2. The eNB of claim 1 wherein the multi-node CSI-RS transmitted by each of the cooperating points is based on a same bit sequence,
   wherein transmissions of the multi-node CSI-RS by different antenna ports are distinguishable, and
   wherein the eNB is configured to indicate to the UE to restrict the CSI reports for the multi-node CSI-RS to a PMI of rank-1.

3. The eNB of claim 2 wherein the first and second cooperating points are associated with different cells having different cell identifiers (IDs), and
   wherein the multi-node CSI-RS transmitted by each of the cooperating points is independent of the cell IDs.

4. The eNB of claim 2 wherein the multi-node CSI-RS transmitted by each of the cooperating points is a NTX CSI-RS wherein N corresponds to a number of antenna ports used by the cooperating points to concurrently transmit the multi-node CSI-RS, and
   wherein the PMI is an NTX PMI.

5. The eNB of claim 4 wherein the multi-node CSI-RS is transmitted concurrently by a first antenna port of the first cooperating point and a second antenna port of the second cooperating point, and
   wherein the UE is configured to distinguish between transmissions of the multi-node CSI-RS on the first and second antenna ports based on an orthogonal complementary code applied to the sequence.

6. The eNB of claim 4 further configured to indicate to the UE to disable channel quality indicator (CQI) and rank indicator (RI) reporting for the multi-node CSI-RS.

7. The eNB of claim 4 wherein the PMI of rank-1 has a constant modulus property with a predetermined structure that includes a quantized phase value from a NTX codebook to indicate the relative phase information.

8. The eNB of claim 4 wherein the eNB is further configured to:
   configure the first cooperating point to transmit a first single-node CSI-RS in first resource elements of the resource block;
   configure the second cooperating point to transmit a second single-node CSI-RS in second resource elements of the resource block; and
   receive additional CSI reports as feedback from the UE, the additional CSI reports including a single-node PMI for each of the single-node CSI-RSs for use in joint beamforming of the coherent joint transmission.

9. The eNB of claim 8 wherein the first single-node CSI-RS, the second single-node CSI-RS, and the multi-node CSI-RS are uniquely coded for each antenna port to allow the UE to distinguish between transmissions from different antenna ports,
   wherein the first single-node CSI-RS is a NTX CSI-RS in which N corresponds to a first number of antenna ports used by the first cooperating point to transmit the first single-node CSI-RS, and
   wherein the second single-node CSI-RS is a NTX CSI-RS in which N corresponds to a second number of antenna ports used by the second cooperating point to transmit the second single-node CSI-RS.

10. The eNB of claim 4 wherein the CSI reports for the multi-node CSI-RS are configured in accordance with an a-periodic CSI reporting mode indicating no channel-quality indicator (CQI) reporting.

11. A method for coherent joint transmission from two or more transmission points, the method comprising:
    configuring at least a first cooperating point and a second cooperating point to jointly transmit a multi-node channel-state information (CSI) reference signal (RS) (CSI-RS) in predetermined resource elements of a resource block;

receiving CSI reports as feedback from user equipment (UE), the CSI reports including a precoding matrix indicator (PMI) indicating relative phase information between the first and second cooperating points based on the multi-node CSI-RS, the CSI reports for the multi-node CSI-RS being restricted to a PMI of rank-1; and configuring at least the first and second cooperating points for a coherent joint transmission to the UE based at least on the relative phase information.

12. The method of claim 11 further comprising indicating to the UE to restrict the CSI reports for the multi-node CSI-RS to a PMI of rank-1, wherein the multi-node CSI-RS transmitted by each of the cooperating points is based on a same bit sequence, and wherein transmissions of the multi-node CSI-RS by different antenna ports are distinguishable.

13. The method of claim 12 wherein the multi-node CSI-RS transmitted by each of the cooperating points is an NTX CSI-RS wherein N corresponds to a number of antenna ports used by the cooperating points to concurrently transmit the multi-node CSI-RS, and wherein the PMI is an NTX PMI.

14. The method of claim 13 further comprising configuring the first cooperating point to transmit a first single-node CSI-RS in first resource elements of the resource block;

configuring the second cooperating point to transmit a second single-node CSI-RS in second resource elements of the resource block; and receiving additional CSI reports as feedback from the UE, the additional CSI reports including a single-node PMI for each of the single-node CSI-RSs for use in joint beamforming of the coherent joint transmission.

15. An evolved Node B (eNB) comprising interface circuitry, processing circuitry, and memory configured to:

configure a first cooperating point and a second cooperating point to jointly transmit a two-transmit antenna (2TX) channel-state information (CSI) reference signal (RS) (2TX CSI-RS) in predetermined resource elements of a resource block;

receive CSI reports as feedback from user equipment (UE), the CSI reports including a 2TX precoding matrix indicator (PMI) based on the 2TX CSI-RS, the 2TX PMI indicating relative phase information between the first and second cooperating points; and configure the first and second cooperating points for a coherent joint transmission to the UE based at least on the relative phase information.

16. The eNB of claim 15 wherein a bit sequence used to generate the 2TX CSI-RS is generated from a configurable seed, wherein the eNB is configured to inform the UE of the configurable seed, and wherein the eNB is further configured to indicate to the UE to restrict the CSI reports for the 2TX CSI-RS to a 2TX PMI of rank-1.

17. The eNB of claim 16 wherein the first and second cooperating points are associated with difference cells having different cell identifiers (IDs), and wherein the 2TX CSI-RS is generated from the configurable seed to be independent of the cell IDs, wherein the 2TX CSI-RS is transmitted concurrently by a first antenna port of the first cooperating point and a second antenna port of the second cooperating point, and wherein the UE is configured to distinguish between transmissions of the 2TX CSI-RS on the first and second antenna ports based on an orthogonal complementary code applied to the bit sequence.

18. An evolved Node B (eNB) configured for coherent joint transmission, the eNB to:

receive channel-state information (CSI) reports as feedback from user equipment (UE), the CSI reports including a precoding matrix indicator (PMI) indicating relative phase information between first and second cooperating points, the relative phase information based on a multi-node CSI reference signal (RS) (CSI-RS) that was jointly transmitted, the CSI reports for the multi-node CSI-RS being restricted to a PMI of rank-1;

receive additional CSI reports as feedback from the UE, the additional CSI reports including a single-node PMI for each of a plurality of single-node CSI-RSs; and configure at least the first and second cooperating points for a coherent joint transmission to the UE based at least on the relative phase information, the coherent joint transmission being jointly beamformed based on the single-node PMIs.

19. The eNB of claim 18 wherein the multi-node CSI-RS transmitted by each of the cooperating points is based on a same bit sequence that is generated from a configurable seed, wherein the eNB is configured to inform the UE of the configurable seed, and wherein a first single-node CSI-RS and a second single-node CSI-RS are based on different bit sequences related to a cell identifier.

20. The eNB of claim 19 wherein the eNB further is to:

configure at least the first cooperating point and the second cooperating point to jointly transmit the multi-node CSI-RS in predetermined resource elements of a resource block for use in measuring relative phase;

configure the first cooperating point to transmit the first single-node CSI-RS in first resource elements of the resource block; and configure the second cooperating point to transmit the second single-node CSI-RS in second resource elements of the resource block.

* * * * *

UNITED STATES PATENT AND TRADEMARK OFFICE
CERTIFICATE OF CORRECTION

PATENT NO. : 8,953,478 B2  
APPLICATION NO. : 13/525509  
DATED : February 10, 2015  
INVENTOR(S) : Davydov et al.

Page 1 of 1

It is certified that error appears in the above-identified patent and that said Letters Patent is hereby corrected as shown below:

On the Title page, item (75), in "Inventors", in column 1, line 5, delete "Nihzny-Novgorod" and insert --Nizhny Novgorod--, therefor In the Claims In column 13, line 26, in Claim 14, after "comprising", insert --:--, therefor Signed and Sealed this  
Seventh Day of July, 2015

Michelle K. Lee  
*Director of the United States Patent and Trademark Office*